US010360813B2

(12) United States Patent
Okayama et al.

(10) Patent No.: US 10,360,813 B2
(45) Date of Patent: Jul. 23, 2019

(54) PULSATILE PUMP FOR CATHETER SIMULATOR

(71) Applicants: OSAKA UNIVERSITY, Suita-shi, Osaka (JP); JMC CORPORATION, Yokohama-shi, Kanagawa (JP); FUYO CORPORATION, Nishitokyo-shi, Tokyo (JP)

(72) Inventors: Keita Okayama, Suita (JP); Yasushi Sakata, Suita (JP); Daichi Watanabe, Yokohama (JP); Makoto Inada, Yokohama (JP); Munekuni Sato, Nishitokyo (JP)

(73) Assignees: OSAKA UNIVERSITY, Osaka (JP); JMC CORPORATION, Yokohama-shi (JP); FUYO CORPORATION, Tokyo (JP)

( * ) Notice: Subject to any disclaimer, the term of this patent is extended or adjusted under 35 U.S.C. 154(b) by 197 days.

(21) Appl. No.: 15/094,841

(22) Filed: Apr. 8, 2016

(65) Prior Publication Data
US 2017/0051736 A1    Feb. 23, 2017

(30) Foreign Application Priority Data

Aug. 20, 2015    (JP) ................................. 2015-163018

(51) Int. Cl.
*G09B 23/28* (2006.01)
*F04B 49/20* (2006.01)
(Continued)

(52) U.S. Cl.
CPC ............ *G09B 23/285* (2013.01); *F04B 17/03* (2013.01); *F04B 19/22* (2013.01); *F04B 49/06* (2013.01);
(Continued)

(58) Field of Classification Search
CPC .............. F04B 11/0008; F04B 11/0041; F04B 11/0091; F04B 13/00; F04B 17/03;
(Continued)

(56) References Cited

U.S. PATENT DOCUMENTS 5,052,934 A * 10/1991 Carey ................... G09B 23/286
                                                                434/268
5,632,623 A *  5/1997 Kolff ...................... G09B 23/28
                                                                434/267

(Continued)

FOREIGN PATENT DOCUMENTS

EP    2772897 A1    9/2014
EP    2772897 B1    5/2016
JP    2014170075 A    9/2014

*Primary Examiner* — Bryan M Lettman
*Assistant Examiner* — Charles W Nichols
(74) *Attorney, Agent, or Firm* — Kenichiro Yoshida

(57) ABSTRACT

A pulsatile flow generating pump for a catheter simulator, which makes it possible to conveniently perform catheter operation training is provided.
The pump (10) includes a cylinder (13) provided inside with a piston performing a reciprocating motion; a driving motor (15) causing the piston to perform a reciprocating motion; a link mechanism (19) converting the rotational motion of the driving motor (15) to the reciprocating motion of the piston; an extrusion port (86b), through which a liquid inside the cylinder is extruded to the outside by the piston; a suction port (86a), through which a liquid from the outside is sucked into the cylinder; and a control unit 70 for controlling the rotation of the driving motor 15. The control unit 70 controls the driving motor 15 so as to output pulsatile flows at a rate of 20 times to 200 times per minute.

6 Claims, 7 Drawing Sheets

(51) Int. Cl.
*F04B 17/03* (2006.01)
*F04B 19/22* (2006.01)
*F04B 49/22* (2006.01)
*F04B 53/16* (2006.01)
*F04B 53/14* (2006.01)
*F04B 53/06* (2006.01)
*G09B 23/30* (2006.01)
*F04B 49/06* (2006.01)

(52) U.S. Cl.
CPC .............. *F04B 49/20* (2013.01); *F04B 49/22* (2013.01); *F04B 53/06* (2013.01); *F04B 53/14* (2013.01); *F04B 53/16* (2013.01); *G09B 23/303* (2013.01)

(58) Field of Classification Search
CPC ........ F04B 19/22; F04B 23/02; F04B 23/025; F04B 35/01; F04B 35/04; F04B 39/0027; F04B 39/0055; F04B 39/0061; F04B 39/121; F04B 39/123; F04B 39/125; F04B 39/16; F04B 41/02; F04B 49/06; F04B 49/20; F04B 49/22; F04B 49/103; F04B 53/06; F04B 53/14; F04B 53/16; F04B 53/20; F04B 2201/0202; F04B 2201/1201; G09B 23/285; G09B 23/303; B01D 19/00; B01D 19/0042; B01D 19/0063

See application file for complete search history.

(56) References Cited

U.S. PATENT DOCUMENTS

| | | | |
|---|---|---|---|
| 8,337,470 B2 * | 12/2012 | Prasad ................ | A61M 39/223 137/493.9 |
| 2010/0106071 A1 * | 4/2010 | Wallenborg ......... | A61M 1/1658 604/5.01 |
| 2013/0196301 A1 * | 8/2013 | Carson ................ | G09B 23/288 434/265 |
| 2014/0099620 A1 * | 4/2014 | Lee ...................... | G09B 23/303 434/268 |
| 2014/0322688 A1 * | 10/2014 | Park ..................... | G09B 23/303 434/268 |

* cited by examiner

PULSATILE PUMP FOR CATHETER SIMULATOR

BACKGROUND OF THE INVENTION

Field of the Invention

The present invention relates to a pulsatile flow generating pump for a catheter simulator.

Description of the Related Art

In the medical settings, for the purpose of performing an examination or treatment of an organ such as heart, a method of inserting a catheter through a blood vessel in the arm or leg and causing the catheter to reach the organ, is conventionally used. In regard to this catheter procedure, various simulators have been suggested in order to promote acquisition or proficiency of the operating techniques. In recent years, in addition to the training utilizing computerized simulators, simulators for realizing training based on a tactile sensation that is closer to that of the actual catheter operation have been proposed.

For example, Patent Document 1 discloses a training apparatus (simulator) which circulates simulated blood (liquid) using simulated organs and simulated blood vessels that have resilience and the like of the same extent as those of live organs. This simulator reduces the preparations for the training and the labor for dealing with aftermaths by circulating a liquid. Also, by injecting a liquid to a heart model (simulated heart) installed on the circulation path and causing the heart model to pulsate (periodical contractile motion), the simulator allows training of the catheter procedures concerning the coronary arteries in a pulsated state, and enables training in an environment closer to reality.

CITATION LIST

Patent Document

Patent Document 1: JP 2014-170075 A

SUMMARY OF THE INVENTION

Problems to be Solved by the Invention

In the catheter simulator disclosed in Patent Document 1, a heart model is subjected to periodical expansion and contraction (pulsation) by circulating a liquid using a centrifugal pump, and periodically fluctuating the supply amount of the liquid flowing into the heart model by means of an electronic valve disposed on the circulation path. The centrifugal pump has a structure that circulates a liquid by imparting fluid power to the liquid through the rotation of a propeller provided inside the pump, and the pump itself is not able to periodically vary the flow amount. Therefore, there is a problem that in order to control the supply amount of the liquid, component parts such as electronic valves and electronic valve controllers are needed, and thus, the structure of the simulator must become complicated.

The present invention was achieved in view of the circumstances described above, and an object of the invention is to provide a pulsatile flow generating pump for a catheter simulator, which enables the catheter operation training to be carried out conveniently.

Means for Solving the Problems

In order to achieve the object described above, the pulsatile flow generating pump for a catheter simulator of the invention includes a cylinder provided inside with a piston performing a reciprocating motion; a driving motor causing the piston to perform a reciprocating motion; a link mechanism converting the rotational motion of the driving motor to the reciprocating motion of the piston; an extrusion port for extruding therethrough a liquid inside the cylinder to the outside by means of the piston; a suction port for sucking in a liquid from the outside into the cylinder therethrough; and a control unit for controlling the rotation of the driving motor, in which the control unit controls the driving motor so as to output pulsatile flows at a rate of 20 to 200 times per minute.

The pulsatile flow generating pump related to the invention is used in a catheter simulator in a state of being connected to the other constituent elements that constitute the simulator. Here, the "catheter simulator" is an apparatus for simulating a catheter procedure, and includes at least a container that is charged with a liquid such as water, and a heart model that is installed within the liquid filling the container and is formed from an elastic material. The pulsatile flow generating pump has a function of causing pulsatile flows to flow into the heart model. The "pulsatile flow" according to the invention corresponds to a flow of the liquid that flows into the heart model, which simulates the blood flow generated by the human heartbeat.

The pulsatile flow generating pump has a cylinder inside the case, and the cylinder is equipped inside with a piston. When the piston performs an outward movement (hereinafter, referred to as "suction movement"), liquid is sucked into the cylinder from the outside of the pump through the suction port provided in the pump, and the inside of the cylinder is filled by the liquid. Next, when the piston performs an inward movement (hereinafter, referred to as "extrusion movement"), the liquid is extruded to the outside through the extrusion port provided in the pump. As this reciprocating motion (suction/extrusion movements) is repeated, the liquid is circulated within the catheter simulator, and pulsatile flows can be periodically caused to flow into the heart model installed inside the container on the circulation path.

Specifically, the liquid extruded from the cylinder to the outside of the pump through an extrusion movement of the piston (pulsatile flow) flows into the heart model installed inside the container, and reaches to various sites and various blood vessels formed in the heart model. The liquid that has passed through the various sites and various blood vessels is discharged to the outside of the heart model (in the container) through an outflow opening formed in the heart model. Subsequently, when the piston performs a suction movement, the liquid inside the container is sucked into the cylinder. In this way, the liquid is circulated within the catheter simulator as a result of the reciprocating motion of the piston, and one pulsatile flow is outputted by one extrusion movement of the piston, while the piston is charged with the liquid by one suction movement of the piston.

As described above, the pulsatile flow generating pump of the invention generates a flow of the liquid that is circulated inside a catheter simulator, and causes pulsatile flows to flow into a heart model installed on the circulation path. Since the supply amount of the circulated liquid can be periodically fluctuated by the reciprocating motion of the piston equipped inside the pump, component parts such as electron valves and electron valve controllers are not needed outside the pump.

The piston described above performs a reciprocating motion based on the power provided by the driving motor.

The rotational motion of the driving motor is converted to the reciprocating motion of the piston by a link mechanism, and the speed of rotation of the driving motor is controlled by a control unit. As described above, since one pulsatile flow is outputted by one extrusion movement of the piston, the number of outputs of the pulsatile flow can be varied in the range of 20 times to 200 times per minute by controlling the rotation of the driving motor by the control unit.

Effect of the Invention

When the pulsatile flow generating pump for a catheter simulator of the invention is used, catheter operation training can be performed based on a convenient configuration.

BRIEF DESCRIPTION OF THE DRAWINGS

FIG. 7A is a plan view diagram of the disassembled component parts, while FIGS. 7B to 7D are cross-sectional diagrams of the umbrella valve at the time of use.

DETAILED DESCRIPTION OF THE PREFERRED EMBODIMENTS

Hereinafter, embodiments of the present invention will be described with reference to the attached drawings.

Figure 1:
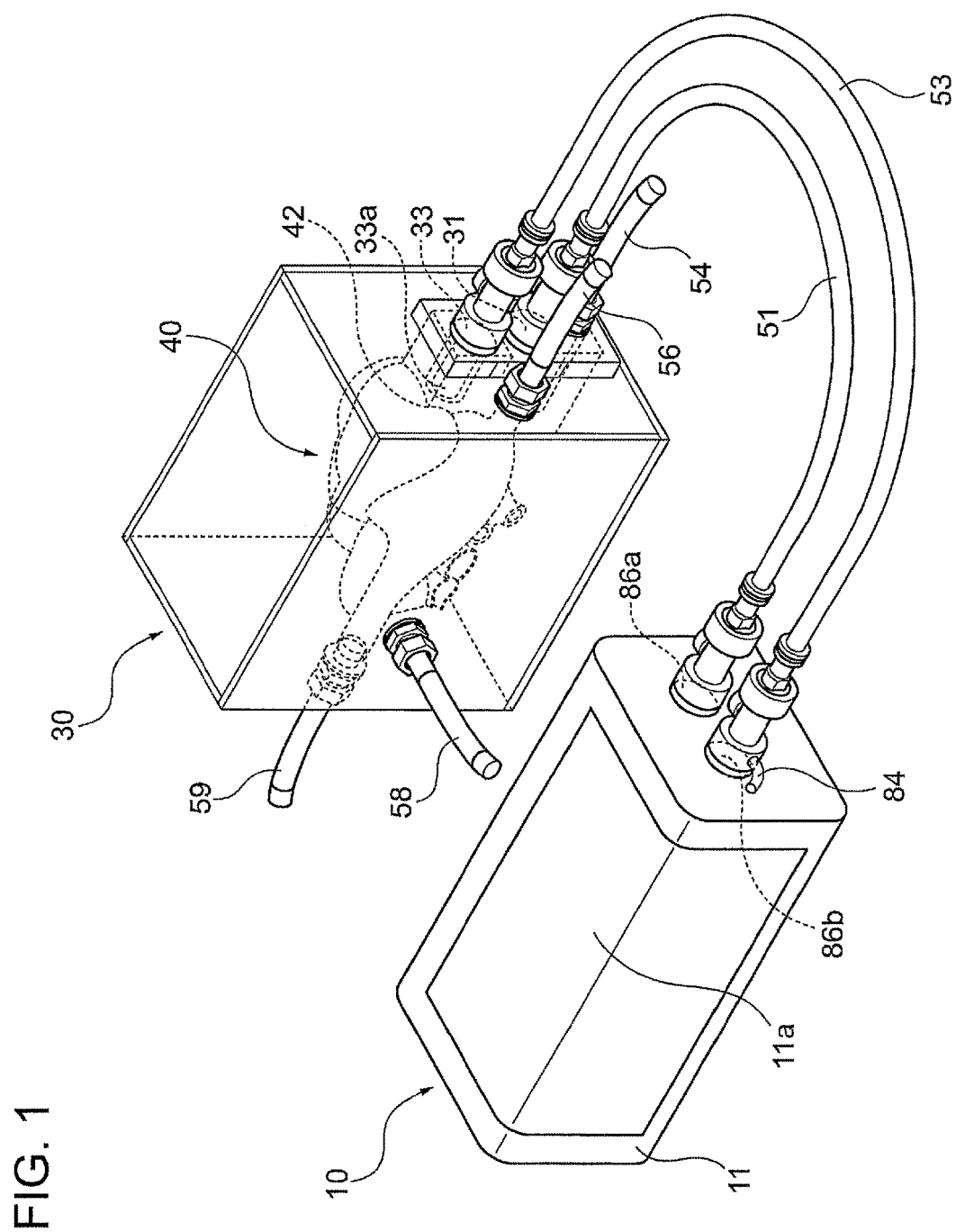
FIG. 1 is an overall outline diagram illustrating one form of usage of a pulsatile flow generating pump for a catheter simulator related to the invention.

FIG. 1 is a diagram illustrating one form of usage of a pulsatile flow generating pump for a catheter simulator related to the invention (hereinafter, referred to as "pump") 10. As illustrated in FIG. 1, the pump 10 is used in a state of being connected to a container for a catheter simulator (hereinafter, referred to as "container") 30 via a suction tube 51 and an extrusion tube 53.

The container 30 is formed into a rectangular parallelepiped shape (having a capacity of about 6 L) with the top being opened, as illustrated in the diagram, and a discharge port 31 and an inlet port 33 are formed on one of the side walls. These discharge port 31 and inlet port 33 are parts to which the suction tube 51 and the extrusion tube 53 of the pump 10 are respectively connected, and these ports are provided together on one side wall as illustrated in the diagram; however, the ports may not be necessarily formed on one side wall. Furthermore, in a case in which the extrusion tube 53 is passed through an opening in the upper side of the container 30, the inlet port 33 is not necessarily needed.

In the container 30, a heart model 40, for which the simulation is intended, is installed in a state of being charged with a liquid. The heart model 40 according to the present embodiment of the invention is formed from a material which has a resilience close to that of a real human heart and is transparent so that after a catheter is inserted, the behavior of the catheter can be monitored. Examples of such materials include PVA (polyvinyl alcohol), polyurethane, an epoxy resin, unsaturated polyester, a phenolic resin, silicone, a material selected from materials similar to the foregoing resins, or a single material selected from other thermosetting resins and thermoplastic resins, or a combination thereof. As illustrated in FIG. 1, the heart model 40 is installed by being fitted into a holding protrusion 33a provided at the inlet port 33. In this case, it is desirable that the heart model 40 is installed within the liquid contained in the container 30, and the heart model 40 can also be installed, for example, by being fitted into holding protrusions provided at the inlet ports for the inlet tubes 54, 56, 58, and 59, through which catheters are introduced into the container; or by a holder exclusive for the heart model provided inside the container 30. Meanwhile, in regard to the heart model 40, plural kinds of heart models may be prepared in accordance with the operation type. For example, a catheter operation intended for the coronary artery can be simulated by providing a heart model of the type in which coronary arteries are formed on the surface of the main body of heart.

The heart model 40 has an inflow opening through which the liquid extruded from the pump 10 is caused to flow into the inside, and an outflow opening through which the influent liquid is caused to flow out to the outside of the heart model. It is desirable that the inflow opening is formed at a position at which the liquid is caused to flow into the heart model, and for example, the inflow opening can be formed at a heart apex (tip on the caudal side of the heart model) 42 of the heart model 40. In this case, when a simulation of TAVI (transcatheter aortic valve implantation) is conducted, the heart apex approach (a surgical method of incising a portion of the chest of a patient, and inserting a catheter to the heart apex by puncturing the heart apex under direct vision), which is one of the approaches implemented in the actual clinical settings, can be carried out. At this time, when a two-way stopcock (tube divided in two ways) is connected to the inlet port 33, the catheter can be inserted from the heart apex 42 without blocking the liquid inflow coming from the pump 10. It is desirable that the outflow opening is formed in the downstream of the site or blood vessel, for which the simulation is intended, on the flow channel of the liquid in the heart model 40, and is capable of discharging the liquid into the container 30. For example, in a case in which the object of simulation is a coronary artery (a heart model having coronary arteries formed on the surface), when the outflow opening is formed at the end (not illustrated in the diagram) of the coronary artery, the liquid that has passed through the coronary artery can be discharged through the end into the container 30.

In regard to the configuration described above, as illustrated in FIG. 1, when the inflow opening formed at the heart apex 42 of the heart model 40 is fitted into the inlet port 33 (holding protrusion 33a), the liquid extruded by the pump 10 (pulsatile flow) flows through the extrusion tube 53 and flows into the heart model 40 through the inlet port 33. Thus, the liquid reaches the sites and the blood vessels inside the heart model 40. The liquid that has passed through these sites or blood vessels is discharged through the outflow opening into the container 30. Next, when the pump 10 performs the suction operation, the liquid filled in the container 30 flows through the suction tube 51 from the discharge port 31 and is circulated to the pump 10. As the pump 10 repeats extrusion and suction of the liquid in this way, the pump 10 circulates the liquid into the catheter simulator, and can cause pulsatile flows to periodically flow into the heart model 40 on the circulation path. At this time, since the heart model 40 is formed from a resilient material as described above, the heart model 40 expands according to inflow of the liquid (pulsatile flow). And when the liquid is discharged through the outflow opening, the heart model 40 is restored to the pre-expansion state by the restoring force of the material described above.

Figure 2:
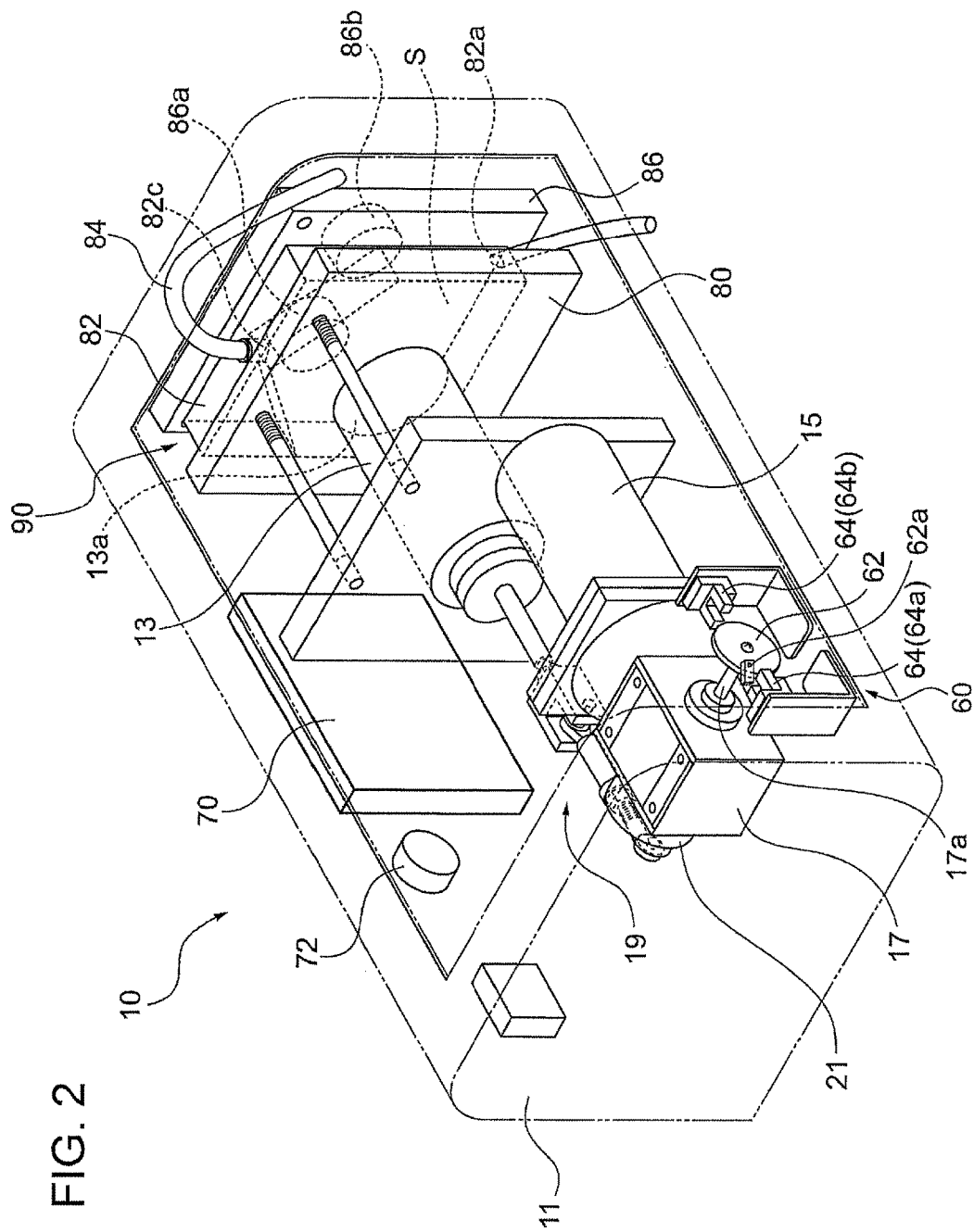
FIG. 2 is a perspective view diagram illustrating the internal configuration of the pulsatile flow generating pump for a catheter simulator illustrated in FIG. 1.
Figure 3:
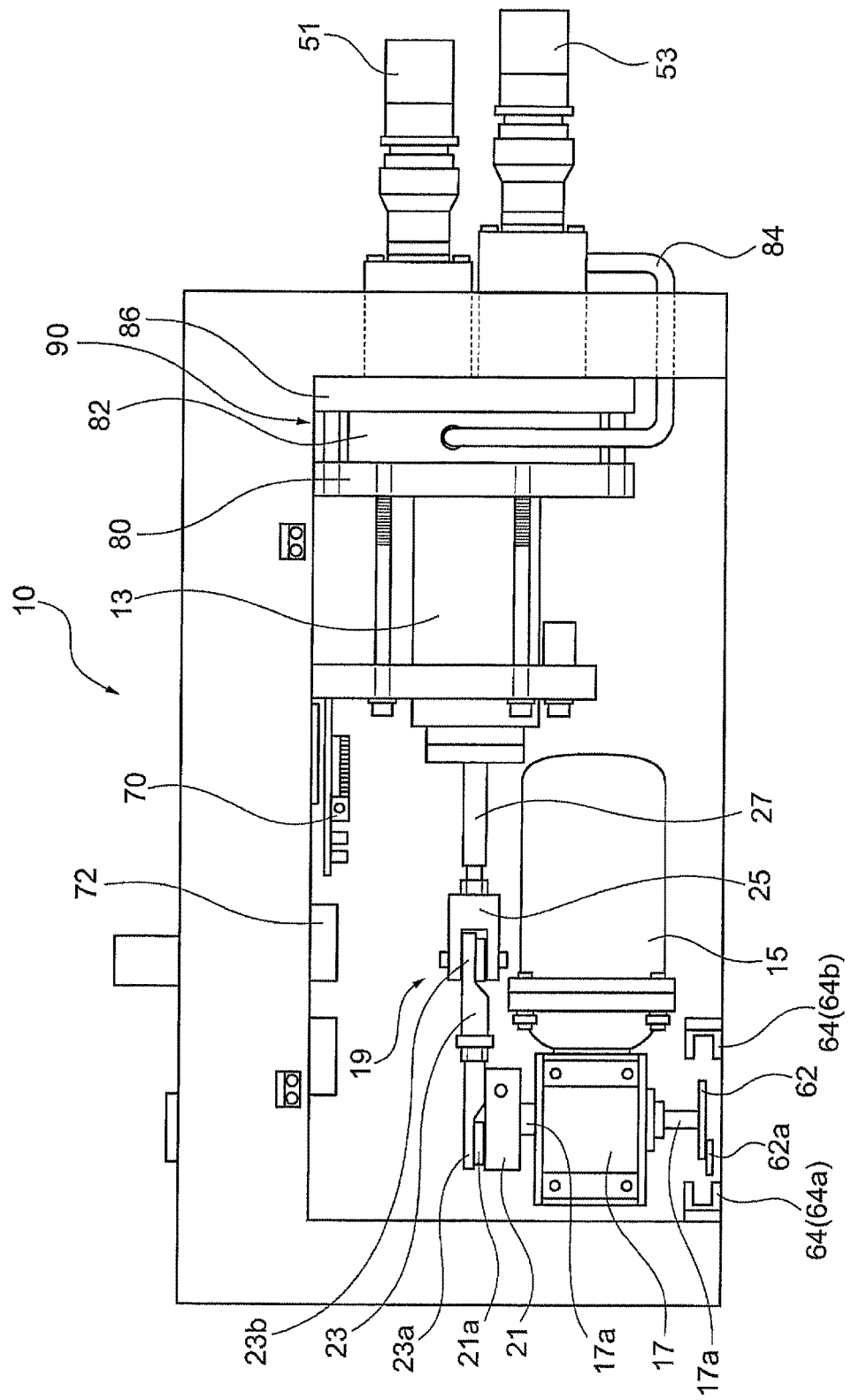
FIG. 3 is a plan view diagram illustrating the pulsatile flow generating pump for a catheter simulator illustrated in FIG. 1, with the top surface cover being removed.

Next, the configuration of the pump 10 illustrated in FIG. 1 will be described with reference to FIG. 2 and FIG. 3. The pump according to the present embodiment includes a case 11 having an approximately rectangular parallelepiped shape, and inside the case 11 a driving mechanism that will be described in detail below as well as a liquid flow channel unit having an air bubble separating mechanism are installed. As illustrated in FIG. 1, the top surface of the case 11 is provided with a top surface cover 11a that is openable and closable, so that dust or contaminants are prevented from penetrating to the inside of the case by closing the top surface cover 11a. Also, the size of the case is about the same as that of the container 30, and thus the case is configured to be easily handled.

The driving mechanism includes an approximately cylindrically shaped cylinder 13 that has a cavity inside and is provided with a piston (not illustrated in the diagram) in the cavity; a driving motor (DC motor) 15 that renders the piston to perform a reciprocating motion; a gear box 17 that reduces the speed of rotation of the driving motor 15 and also rotates the power transmission shaft of the driving motor 15 by 90° to thereby transmit power; and a link mechanism 19 that is provided between the gear box 17 and the piston (inside the cylinder 13).

The internal cavity of the cylinder 13 is such that the space is divided into two by the piston, and as the piston moves, the volume proportions of the respective divided spaces are changed. The piston is provided so as to block the passage of liquid. When the piston moves from the bottom opening 13a of the cylinder toward the side of the link mechanism 19 (suction movement), liquid is sucked in through the bottom opening 13a, and the space surrounded by the piston, the bottom opening 13a, and the side walls of the cylinder is filled with the liquid. Subsequently, when the piston moves from the side of the link mechanism 19 toward the bottom opening 13a (extrusion movement), the liquid filling the container is extruded through the bottom opening 13a.

Inside the gear box 17, as described above, a gear train (not illustrated in the diagram) that reduces the speed of rotation of the driving motor 15 and also converts the rotating shaft of the driving motor by 90°, is provided, and the rotational driving force of the driving motor 15 is transmitted to the output shaft 17a that perpendicularly intersects the rotating shaft of the driving motor. The output shaft 17a is protruded from both sides of the gear box 17, and one side thereof is connected to the link mechanism 19, while the other side is provided with a sensor mechanism 60 that detects the speed of rotation of the output shaft 17a.

Figure 4:
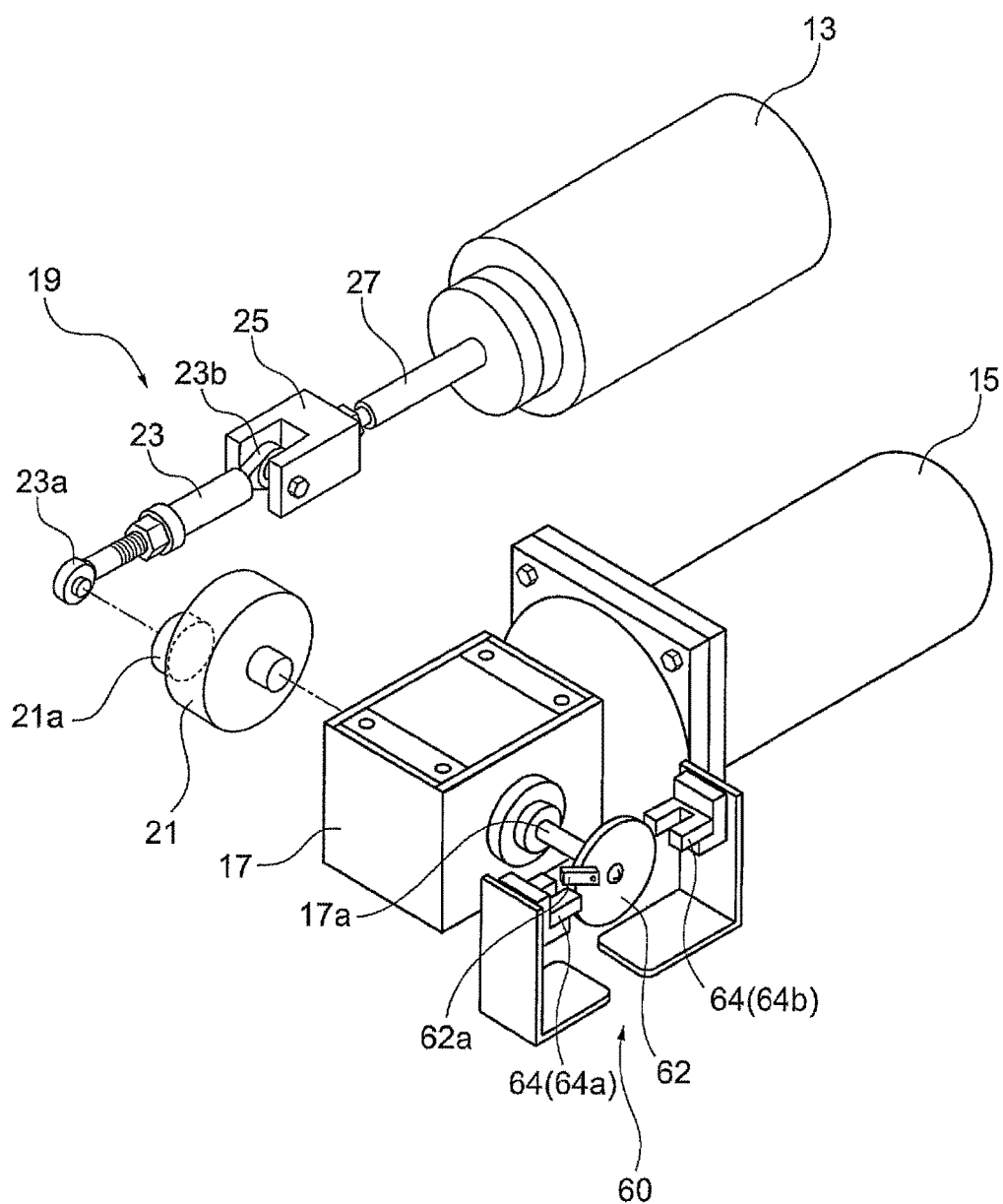
FIG. 4 is a magnified view diagram illustrating the driving mechanism of the pulsatile flow generating pump for a catheter simulator illustrated in FIG. 2.

The link mechanism 19 has a function of converting the rotational motion of the output shaft 17a from the gear box 17 to a linear reciprocating motion (suction and extrusion movements) of the piston. As illustrated in FIG. 4, the link mechanism 19 includes a rotating plate 21 that is fixed to the output shaft 17a; a protrusion 21a provided at an eccentric position of the rotating plate 21; a linking rod 23 having one end 23a connected to the protrusion 21a; a joint 25 having a U-shaped cross-section, which pivotally supports the other end 23b of the linking rod 23 so as to be rotatable; and a shaft 27 that connects the joint 25 and the piston (inside the cylinder 13).

In regard to the configuration described above, when the output shaft 17a is subjected to rotational driving by the rotational driving of the driving motor 15, the one end 23a of the linking rod 23 fixed to the protrusion 21a on the rotating plate 21 revolves on the circumference of the rotating plate 21. As a result of this revolution, the other end 23b of the linking rod 23 causes the piston in the cylinder 13 to reciprocate by means of the joint 25 and the shaft 27 that are connected. For example, in a case in which the protrusion 21a is at a position that is farthest from the cylinder 13 (leftmost side in FIG. 4) on the circumference of the rotating plate 21, the linking rod 23 is also in a state of being farthest from the cylinder 13, and the piston is pulled to the leftmost side in the cylinder 13 (hereinafter, referred to as "position X"), so that the amount of liquid inside the cylinder 13 becomes the maximum. From this state, when the protrusion 21a rotates 180° and moves to a position closest to the cylinder 13 (rightmost in FIG. 4), the linking rod 23 is also in a state of being closest to the cylinder 13, and the piston is pushed to the rightmost side in the cylinder 13 (hereinafter, referred to as "position Y"), so that the amount of liquid inside the cylinder 13 becomes the minimum.

Next, the sensor mechanism 60 described above will be described with reference to FIG. 4. The sensor mechanism 60 is disposed at an end of the output shaft 17a, and on the opposite side of the link mechanism 19 with respect to the gear box 17. The sensor mechanism 60 includes a rotating plate for light detection 62 that is fixed to the rotating shaft 17a; a protruding plate 62a that is fixed so as to protrude from the rotating plate 62; and light detecting elements 64 that detect the passage of the protruding plate 62a. The light detecting elements 64 are disposed at two sites (64a and 64b, respectively) and are installed so as to be able to detect the passage of the protruding plate 62a at a revolutionary interval of 180°. Specifically, the light detecting element 64a detects the passage of the protruding plate 62a when the piston reaches the position X described above, and the light detecting element 64b is disposed so as to be able to detect the passage of the protruding plate 62a when the piston reaches the position Y described above. That is, in the present embodiment, the light detecting elements 64a and 64b are respectively installed at positions at which the times of initiation of the extrusion movement and the suction movement of the piston can be detected.

The state of rotation of the driving motor 15 is controlled by the control unit 70. As described above, since the rotational motion of the driving motor 15 is converted to the reciprocating motion of the piston by the link mechanism 19, the speed of the reciprocating motion of the piston can be controlled by the control unit 70. As described above, since one pulsatile flow is outputted by one extrusion movement of the piston, the number of outputs of the pulsatile flows can be controlled in the range of 20 times to 200 times per minute, by controlling the speed of rotation of the driving motor by the control unit.

In real human heart, since one pulsatile flow is generated by one pulse, the number of outputs of the pulsatile flows corresponds to the pulse rate of the heart (heart rate). In this case, on the occasion of simulating the catheter operation intended for a real heart, if the pulses of the human body that can be assumed is considered, a heart rate of 20 bpm to 200 bpm (beats per minute) is sufficient, and in actual cardiac surgery, it may be considered that most of the operations are performed at a heart rate in the range of about 40 bpm to 100 bpm. Therefore, in regard to the performance of the pump 10, it is acceptable as long as the pump can transmit pulsatile flows to a heart model at a rate of 20 times to 200 times per minute, and even in the case of considering the load of the pump, if a pump having a capacity capable of transmitting pulsatile flows to a heart model at a rate of at least 40 times to 150 times per minute is used, an practical simulation can be carried out. Furthermore, if a pump having a capacity with a maximum pressure of about 300 mmHg is used, it is possible to realize a liquid flow equivalent to the actual blood flow (blood pressure) in the human body in the heart model installed.

Regarding the number of outputs of the pulsatile flows, an optimum value can be selected in the range of 20 bpm to 200 bpm according to the content of the simulation, by means of an adjusting dial 72 provided on a lateral surface of the case 11. Furthermore, catheter manipulation can also be continuously carried out at various pulse rates by operating the dial 72 during the simulation.

The number of outputs of the pulsatile flow can be set in a variable mode in which any one or both of the extrusion rate and the suction rate of the piston are changed (variable mode of varying the speed of rotation of the driving motor 15), and in a mode of rotating the driving motor 15 at a constant speed (sine mode) so that the extrusion rate and the suction rate of the piston are equal. According to the present embodiment, in order to reproduce a condition that is closer to the actual pulsatile flows in the human body, the number of outputs of pulsatile flows is controlled by setting the extrusion rate of the piston (extrusion time; time taken to generate a single pulsatile flow) to be constant, while varying the suction rate (suction time). That is, in the human body, the heart contracts one time for about 300 ms to generate one pulsatile flow; therefore, in the present embodiment as well, the extrusion rate of the piston is set to be constant so that one pulsatile flow is extruded in 300 ms. In this case, if the number of outputs of the pulsatile flow increases, the extrusion rate cannot be maintained constant in the sine mode of the driving motor 15. Therefore, the driving motor is controlled such that the extrusion rate is set to be constant, while only the suction rate becomes faster.

The extrusion rate and the suction rate of the piston are individually set as the control unit 70 controls the speed of rotation of the driving motor 15 based on the detection signals of the light detecting elements 64a and 64b mentioned above. As described above, since the times of initiation of the extrusion movement and the suction movement of the piston are detected by the light detecting elements 64a and 64b, the time period from the point of detecting the detection signal of the light detecting element 64a to the point of detecting the detection signal of the light detecting element 64b corresponds to the extrusion movement period of the piston, and the time period from the point of detecting the detection signal of the light detecting element 64b to the point of detecting the detection signal of the light detecting element 64a becomes the suction movement period of the piston. Therefore, based on these detection signals, the control unit 70 can change the speed of rotation of the driving motor 15 such that the rates of the extrusion movement and the suction movement of the piston are different from each other, and thereby, a condition that is closer to the pulsatile flows in the human body can be reproduced.

Specifically, for example, when it is intended to generate pulsatile flows based on a general pulse rate (about 60 bpm) during an actual cardiac surgery, the ratio between the extrusion time and the suction time of the driving motor 15 is considered to be about 3:7.

Next, the liquid flow channel unit disposed between the bottom opening 13a of the cylinder 13 and the outside of the pump 10 will be described with reference to FIG. 2, FIG. 3, and FIG. 5. The liquid flow channel unit includes a cylinder holding plate 80 that holds the bottom opening 13a; and an external connection plate 86 having formed thereon a suction port 86a that sucks in liquid from the outside (heart model side) and an extrusion port 86b that extrudes the liquid to the outside. The suction port 86a and the extrusion port 86b are respectively provided with a one-way valve, and are respectively configured such that the suction port 86a allows inflow of liquid from the outside of the pump 10 so as to regulate the outflow to the outside, and the extrusion port 86b allows outflow of liquid to the outside of the pump 10 so as to regulate inflow from the outside. Regarding the one-way valve, for example, the umbrella valve 100 (see FIGS. F7A through 7D) that will be described below can be used; however, the one-way valve is not intended to be limited to this.

Figure 6:
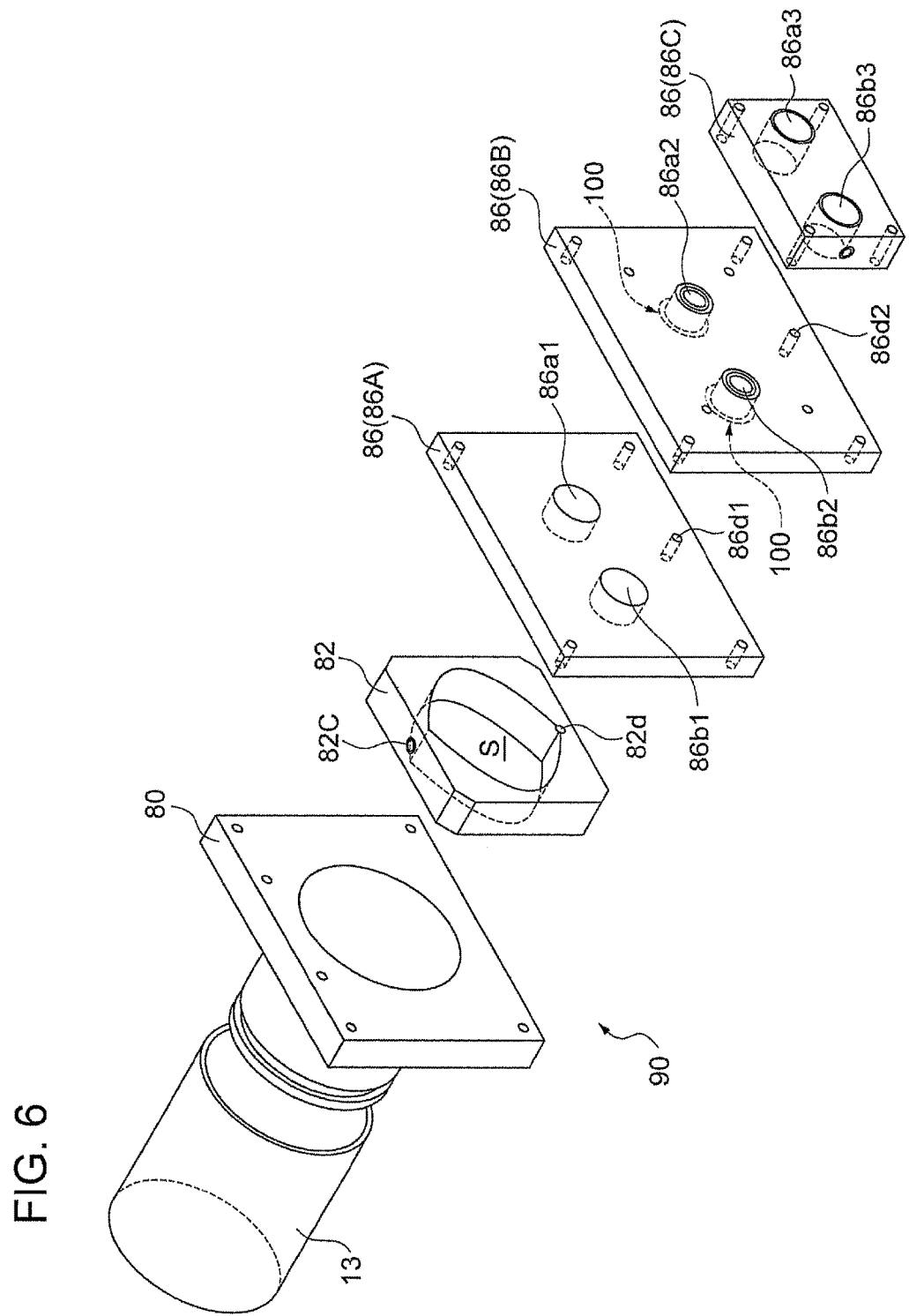
FIG. 6 is a magnified exploded view diagram illustrating a liquid flow channel unit according to another embodiment of the pulsatile flow generating pump for a catheter simulator related to the invention.

FIG. 6 illustrates another embodiment of the liquid flow channel unit. According to this embodiment, the external connection plate 86 is configured to include a first external connection plate 86A, a second external connection plate 86B, and a third external connection plate 86C, and the first external connection plate 86A includes a first suction port 86a1 and a first extrusion port 86b1, while the second external connection plate 86B includes a second suction port 86a2 that is in communication with the first suction port 86a1, and a second extrusion port 86b2 that is in communication with the first extrusion port 86b1. The second suction port 86a2 and the second extrusion port 86b2 are respectively provided with an umbrella valve 100 that functions as a one-way valve. The third external connection plate 86C includes a third suction port 86a3 that is in communication with the second suction port 86a2, and a third suction port 86a3 that is in communication with the second extrusion port 86b2. The suction tube 51 is connected to the third suction port 86a3, and the extrusion tube 53 is connected to the third suction port 86a3.

Figure 7A:
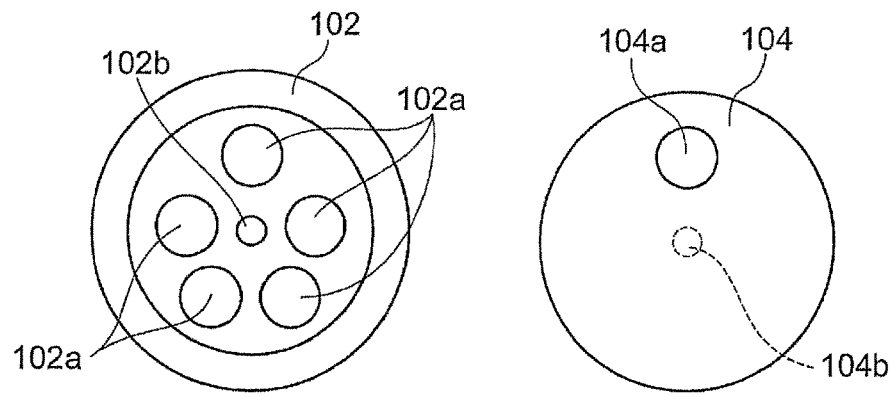
FIGS. 7A through 7D are explanatory diagrams for an umbrella valve provided in the pulsatile flow generating pump for a catheter simulator related to the invention.
Figure 7B:
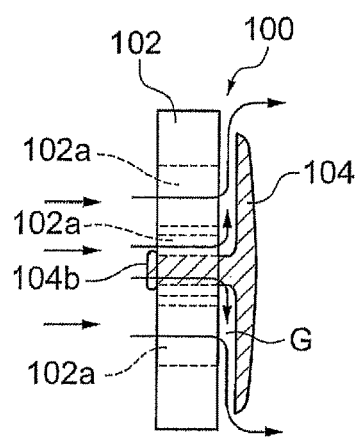

The umbrella valve 100 will be described with reference to FIGS. 7A through 7D. As illustrated in FIG. 7A, the umbrella valve 100 has an approximately disc-shaped main body 102 equipped with plural (five in the diagram) openings 102a; and an umbrella-shaped body 104 that is connected by fitting into an opening 102b formed approximately at the center of the main body 102. The umbrella-shaped body 104 is formed from a flexible material, and as illustrated in FIG. 7B, the umbrella-shaped body 104 is connected by being inserted into the opening 102b such that a slight gap is left between the umbrella-shaped body 104 and the main body 102, and thus the umbrella-shaped body is integrated with the main body. Here, the umbrella-shaped body 104 is configured such that, by having a convexity 104b at the tip that is inserted into the opening 102b, or the like, the umbrella-shaped body 104 is fixed to the main body 102 after insertion, and also, as will be described below, the connection is maintained even in a case in which the umbrella-shaped body 104 is pressed by the liquid. Meanwhile, the umbrella-shaped body 104 may have an opening 104a, as illustrated in FIG. 7A. The effect obtainable in the case of having the opening 104a will be described below.

Figure 7C:
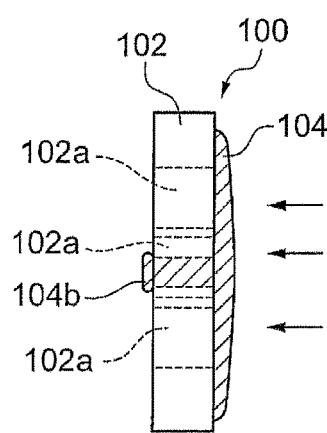

Next, the operating effect of the umbrella valve 100 in a case in which the umbrella-shaped body 104 does not have the opening 104a will be described with reference to FIG. 7B and FIG. 7C. The umbrella valve 100 allows the flow of liquid from the side of the main body 102 toward the side of the umbrella-shaped body 104 (FIG. 7B), and regulates the flow from the side of the umbrella-shaped body 104 toward the side of the main body 102 (FIG. 7C). Specifically, in a case in which liquid flows in from the side of the main body 102 (left-hand side in the diagram) to the umbrella valve 100, the liquid passes through the openings 102a in the main body 102, passes through the gap G generated by moving the umbrella-shaped body 104 in the axial direction due to the inflow pressure, and flows out through the outer circumference of the umbrella-shaped body 104, to reach the outside of the umbrella-shaped body 104 (right-hand side in the diagram). On the other hand, as illustrated in FIG. 7C, in a case in which liquid flows in from the side of the umbrella-shaped body 104 (right-hand side in the diagram) to the umbrella valve 100, the umbrella-shaped body 104, which is flexible, is pressed to be attached tightly to the main body 102 due to the inflow pressure of the liquid, and blocks the plural openings 102a. Thereby, the liquid cannot passes through the openings 102a, and the flow from the side of the umbrella-shaped body 104 to the side of the main body 102 is regulated.

As such, in a case in which an umbrella valve 100 that functions as a one-way valve is provided at the second suction port 86a2, the umbrella valve 100 is disposed such that the main body 102 comes to the side of the suction tube 51 (side of the container 30), and the umbrella-shaped body 104 comes to the side of the cylinder 13. Furthermore, in a case in which the umbrella valve 100 is provided at the second extrusion port 86b2, the umbrella valve 100 is disposed such that the main body 102 comes to the side of the cylinder 13, and the umbrella-shaped body 104 comes to the side of the extrusion tube 53 (side of the container 30).

Figure 7D:
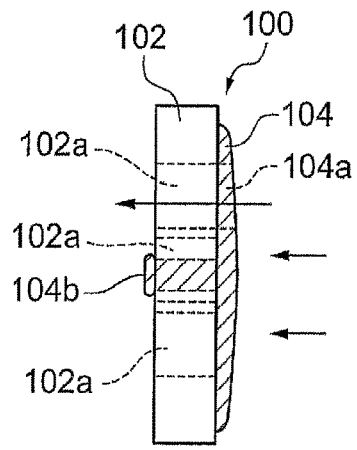

As illustrated in FIG. 7A, an opening 104a may be formed in a part of the umbrella-shaped body 104 of the umbrella valve 100 provided at the second extrusion port 86b2, so as to be in communication with a portion of some of the plural openings 102a. In this case, as illustrated in FIG. 7D, even in a case in which liquid flows in from the side of the umbrella-shaped body 104 at the time of the suction operation of the pump 10, and the umbrella-shaped body 104 is pressed to be attached tightly to the main body 102 due to the inflow pressure of the liquid, a portion of the liquid can pass through the valve through an opening 102a that is in communication with the opening 104a.

In this way, by suctioning in a portion of the liquid to the pump 10 even through the second extrusion port 86b2 at the time of the suction operation of the pump 10 (the inflow of the liquid from the outside of the pump 10 at the second extrusion port 86b2 is not completely blocked), the flow of liquid into the heart model 40 can be reproduced in a condition that is closer to reality. In the human body, the aortic valve is closed by the blood stream that returns from the side of the aorta toward the heart during the diastolic phase. For example, in a case in which a heart model 40 having an aortic valve is installed inside the container 30 in order to perform the simulation of TAVI, a portion of the liquid that has been sent from the side of the heart main body to the side of the aorta, may return from the side of the aorta toward the side of the heart main body and generate a flow. Therefore, a condition in which the aortic valve formed on the path of the aorta and the heart main body is closed by the flow in the counter flow direction, can be reproduced more reliably.

As a result, in regard to the simulation of TAVI, after a stent valve has been implanted, it can be checked whether the aortic valve can be normally opened and closed by an artificial valve, and a series of simulations similar to the actual surgical operations can be implemented. Furthermore, in a case in which it is intended to track the flow of liquid after an imaging agent or the like is introduced, as in the case of actual surgical operations, the flow returning from the side of the aorta toward the side of the heart main body becomes visible, and the condition in which the aortic valve is closed can be checked, together with the flow. Therefore, the simulation can be achieved in a condition that is closer to the surgical operations in reality.

Since the returning liquid constitutes only a portion of the entirety of the liquid that has been sent by the pump, most of the liquid is ejected from the side of the main heart body toward the side of the aorta, and is discharged at the openings of the subclavian artery, the internal carotid artery/coronary artery, or the coronary artery, all of which are branched from the aorta. As such, since the movement of a liquid simulating conventional physiological blood stream is reproduced, for example, even in a case in which an imaging agent or the like is introduced as in the case of actual surgical operations, coronary artery imaging can be reproduced in the same manner as in actual surgical operations. Thus, also in the simulation of TAVI, the positions of the coronary ostium and the stent valve during the course of procedure can be checked, and it can be checked whether the flow in the coronary artery is maintained after the implantation of the stent valve.

Meanwhile, in the present embodiment, an opening 104a having a shape and an area that are equivalent to one opening among the five openings 102a of the main body 102 is formed in the umbrella-shaped body 104 (FIG. 7A); however, the invention is not intended to be limited to this. Openings 104a may be formed such that, as the umbrella valve 100 functions as a one-way valve, a flow of liquid that is circulated through the pump 10, the heart model 40, and the container 30 is generated, and also, the liquid is sucked in through a portion of the extrusion port that sends the liquid into the heart model (such that the openings 104a are in communication with some of the openings 102a). According to the present embodiment, the areas of the openings 102a of the umbrella valve 100 provided respectively at the suction port and the extrusion port are equal, and the area of the opening 104a formed in the umbrella-shaped body 104 is the same as the area of one of the openings 102a. In a case in which the amount of liquid sucked into the pump 10 is designated as 1, it can be said that the amount of liquid that is sucked in through the suction port is 5/6, which corresponds to the portion of five of the openings 102a, and the amount of liquid that is sucked in through the extrusion port is 1/6, which corresponds to the portion of one of the opening 102a. Meanwhile, it is desirable that the amount of liquid that is sucked in through the suction port is set so as to close the aortic valve stably. For example, the amount of flow can be stabilized in an optimal state, by varying the size or number of the opening 104a.

Figure 5:
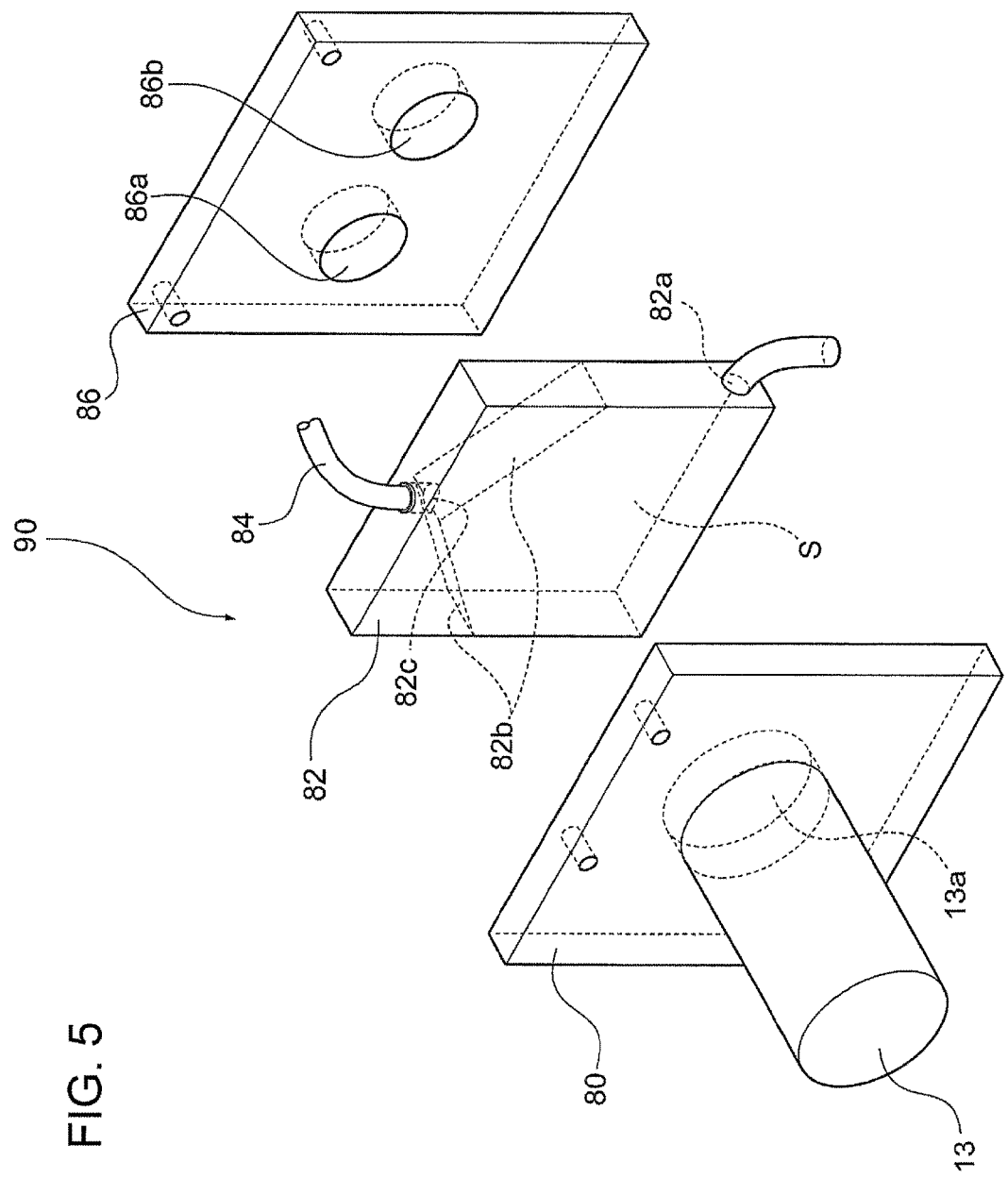
FIG. 5 is a magnified exploded view diagram illustrating the air bubble separating mechanism of the pulsatile flow generating pump for a catheter simulator illustrated in FIG. 2.

As illustrated in FIG. 5, a storage unit 82 for storing a liquid is provided between the cylinder holding plate 80 and the external connection plate 86. The storage unit 82 is a plate-shaped member, and has formed therein an approximately ridge-shaped cavity S that stores the liquid; and an air bubble separating mechanism 90 that separates air bubbles in the liquid. The air bubble separating mechanism 90 is not necessarily needed; however, in general, in a catheter simulator that circulates a liquid, there is a problem that the heart model, for which the simulation is intended, may become not easily visible due to air bubbles in the liquid. Thus, the air bubble separating mechanism 90 is effective as a countermeasure for this problem.

The air bubble separating mechanism 90 in FIG. 5 is provided in the storage unit 82, and includes inclined planes 82b that guide the air bubbles that have flowed into the cavity S to the top; an air bubble discharge port 82c formed at the apex of the inclined plane 82b; and an air bubble discharge tube 84 connected to the air bubble discharge port 82c. As illustrated in FIG. 1 and FIG. 3, the tip of the air bubble discharge tube 84 is connected to the extrusion tube 53 (flow channel extending from the extrusion port 86b). The air bubble discharge tube 84 may be long, and for example, if the air bubble discharge tube 84 is wound several times around the driving motor 15 and then introduced into the extrusion tube 53, an effect of cooling the driving motor 15 may be obtained (not illustrated in the diagram). Meanwhile, it is preferable that the air bubble discharge tube 84 is provided with a one-way valve, for example, a duckbill valve (not illustrated in the diagram), that passes air bubbles only to the side of the extrusion tube 53, and thereby, the air remaining in the air bubble discharge tube can be prevented from being sucked in and returning at the time of the suction operation. Also, if an opening 82a is provided in the lower part of the storage unit 82, and a tube is connected to the opening 82a, the liquid remaining in the cavity S can be discharged after completion of the simulation.

In regard to the configuration described above, when the liquid flows into the cavity S by the extrusion movement of the piston, the air bubbles that have flowed in together with the liquid move upward along the inclined planes 82b. The air bubbles that have moved upward and reached the apex of the inclined planes 82b are discharged to the outside through the air bubble discharge port 82c, pass through the air bubble discharge tube 84, and flow into the extrusion tube 53. On the other hand, the greater part of the liquid that had flowed into the cavity S, which does not include air bubbles, flows out to the extrusion port 86b, which is an opening having a larger opening area. In this way, air bubbles flow out to the air bubble discharge port 82c, while most of the liquid flows out to the extrusion port 86b, and thus, air bubbles are separated from the liquid. Then, the collected air bubbles can be discharged to the outside of the pump 10 (extrusion tube 55). In this way, most of the air bubbles are discharged to the container 30 through the extrusion tube 53 and the heart model 40, and then are release into air, immediately after the pump operation. Furthermore, in preparation for a situation in which air bubbles have flowed into the cavity S for some reason during the pump operation, the air bubble separating tube 84 may be provided with, for example, a closure mechanism such as clips, in order to prevent the air bubbles from reaching the extrusion tube 53 and the heart model 40.

In regard to the opening 82a that enables discharge of the liquid remaining in the cavity S after completion of the simulation, as illustrated in FIG. 6, the opening 82a may be provided at the bottom center of the storage unit 82 (opening 82d), or openings 86d1 and 86d2 may also be formed at positions corresponding to the opening 82d at the bottom centers of the first external connection plate 86A and the second external connection plate 86B, and then the remaining liquid may be discharged through the opening 86d2. In that case, if the shape of the cavity S is made into a rhombus shape as illustrated in FIG. 6, the remaining liquid can be efficiently collected at the opening 82d, and can be discharged through a tube or the like (not illustrated in the diagram) connected to the opening 86d2.

Next, the method for using a pulsatile flow generating pump 10 having the air bubble separating mechanism 90 described above will be described.

First, the pump 10 and the container 30 described above are connected through the suction tube 51 and the extrusion tube 53 described above, and then the container 30 is charged with a liquid. While the heart model 40 described above is not yet installed, when the pump 10 is operated in this state to circulate the liquid, air bubbles formed by the air remaining inside the suction tube 51 and the extrusion tube 53 can be removed.

Specifically, these remaining air bubbles flow into the air bubble separating mechanism 90 by suction of the pump 10, and as described above, the air bubbles pass through the air bubble separating tube 84 and flow out to the extrusion tube 53. The air bubbles flow into the inlet port 33 through the extrusion tube 53, and are discharged into the container 30 through the inlet port 33 that is open without a heart model 40 being installed. Then, the air bubbles reach the surface of the liquid in the container 30, and are released into the outside air. After air bubbles are removed in this manner, the heart model 40 is installed in the container 30. When the heart model 40 is installed, it is desirable that the heart model 40 submerged into the liquid to extract air, and is connected to the holding protrusion 33a or the like of the container 30 within the liquid, so that the air remaining inside the heart model 40 does not remain as air bubbles.

When the preparation is achieved as described above, and the liquid is circulated by operating the pump 10 again, pulsatile flows from which air bubbles have been removed are extruded from the pump 10 to the heart model 40. In this state, catheters are introduced through the catheter inlet tubes 54, 56, 58, and 59, and the simulation of a catheter procedure is implemented for the heart model 40. The catheter inlet tubes 54, 56, 58, and 59 are selectively used according to the content of the simulation. That is, the simulation can be carried out by selecting appropriate catheter inlet tubes depending on the case in which the blood vessel that is subjected to catheter introduction is an arm, a leg, an artery, a vein, or the like. Furthermore, regarding the heart model 40, a suitable model can be selected according to the various diseases for which the simulation is intended, and can be switched and connected to the container. For example, in a case in which the simulation of coronary arteries that run along the heart surface is performed, a heart model having coronary arteries on the surface, which is formed such that pulsatile flows flow into the coronary arteries can be used. In the case of the coronary artery type, the heart model expands at the time that the pump performs an extrusion movement, and at this time, liquid flows into the coronary artery part. Therefore, the simulation can be implemented in a condition similar to the actual heartbeat. That is, although an actual heart sends blood on the occasion of contraction, the inflow of blood into the coronary arteries occurs mainly when the heart expands (diastolic phase). Therefore, in the simulation of the coronary artery type, since liquid flows into the coronary arteries at the time of expansion, exercise can be made in a condition that is similar to the actual motion of the heart.

As described above, when the pulsatile flow generating pump 10 for catheter simulation as described above is used, since pulsatile flows are generated by the reciprocating motion of the piston inside the cylinder 11 that is provided in the pump 10, component parts such as electronic valves and electronic valve controllers intended for generating pulsatile flows are not needed to be provided inside the catheter simulator. Furthermore, when the speed of the motor 15 driving the piston is controlled by the control unit 70 such that the rates of the extrusion movement and the suction movement of the piston are different from each other, pulsation flows can be outputted at a rate in the range of 20 times to 200 times per minute, which is a condition closer to the human body.

Furthermore, the pump 10 according to the present embodiment is capable of collecting and separating air bubbles in the liquid by the pump itself, and thus air bubbles can be removed to the outside of the simulator before a simulation is performed. Therefore, a simulation can be conducted in a state in which the influence exerted by air bubbles has been reduced.

Meanwhile, in order to further suppress the influence exerted by air bubbles, it is desirable to perform a pretreatment on the liquid to be circulated. Particularly, in the case of using an aqueous solution containing an alcohol as the liquid, the aqueous solution is in a state of being prone to generate air bubbles. Therefore, generation of air bubbles can be suppressed by taking measures such as first boiling water and slowly returning the temperature to normal temperature, or reducing the pressure to a pressure just above the vapor pressure, before alcohol is dissolved in that water; or by taking measures such as forcibly generating foam with an ultrasonic cleaner or the like when foam is produced upon mixing of water and alcohol.

Thus, examples of the pulsatile flow generating pump for catheter simulation related to the present invention have been disclosed; however, the invention is not intended to be limited to the embodiments described above, and various alterations can be applied to the extent that the purpose of the invention is maintained. For example, the shape of the cylinder, the configuration of the link mechanism, the position of installation of the air bubble separating mechanism, and the like can be appropriately modified. Furthermore, in the present embodiment, the size of the container is considered so as to enable the simulation to be carried out on the table together with the pump, by setting the capacity of the container 30 to about 6 L. However, there are no limitations on the size or shape of the container 30 to be used, and also for the pump 10, a pump having a larger size may be used.

EXPLANATIONS OF LETTERS OR NUMERALS

10 PULSATILE FLOW GENERATING PUMP FOR CATHETER SIMULATOR
13 CYLINDER
13a BOTTOM OPENING OF CYLINDER
15 DRIVING MOTOR
19 LINK MECHANISM
30 CONTAINER FOR CATHETER SIMULATOR
31 DISCHARGE PORT
33 INLET PORT
40 HEART MODEL
51 SUCTION TUBE
53 DISCHARGE TUBE
54, 56, 58, 59 CATHETER INLET TUBE
60 SENSOR MECHANISM
70 CONTROL UNIT
80 CYLINDER HOLDING PLATE
82 STORAGE UNIT
82b INCLINED PLANE
82c AIR BUBBLE DISCHARGE PORT
84 AIR BUBBLE DISCHARGE TUBE
86a SUCTION PORT
86b EXTRUSION PORT
90 AIR BUBBLE SEPARATING MECHANISM
100 UMBRELLA VALVE (ONE-WAY VALVE

What is claimed is:

1. A pulsatile flow generating pump for a catheter simulator, comprising a pump and a heart model connected to the pump, the pump further comprising:
   a cylinder provided inside with a piston performing a reciprocating motion;
   a driving motor causing the piston to perform a reciprocating motion;
   a link mechanism converting the rotational motion of the driving motor to the reciprocating motion of the piston;
   an extrusion port for extruding therethrough a liquid inside the cylinder to the outside by means of the piston;
   a suction port for sucking in a liquid from the outside into the cylinder therethrough;
   a control unit for controlling the rotation of the driving motor, wherein the heart model ultimately connected to the suction port and the extrusion port and being charged with the liquid for monitoring a catheter that is inserted into the heart model for simulation,
   wherein the control unit controls the driving motor so as to output pulsatile flows at a rate of 20 times to 200 times per minute; and
   a storage unit for storing a liquid is provided between the bottom opening of the cylinder and the suction port as well as the extrusion port, wherein the storage unit has an air bubble separating mechanism for excluding to the outside of the catheter simulator air bubbles remaining in the liquid, to separate and remove the air bubbles that are sucked into the storage unit by the pump along with the liquid in a container for installing the heart model, the air bubble separating mechanism including inclined planes for forming an apex on an upside to guide the air bubbles present inside the storage unit to the upside, an air bubble discharge port formed at the apex of the inclined planes and open to the outside, and an air bubble discharge tube whose tip being connected to the air bubble discharge port that is linked to a flow channel extending from the extrusion port.

2. The pulsatile flow generating pump for a catheter simulator according to claim 1, wherein
   the pump comprises a sensor mechanism for detecting the speed of rotation of the driving motor, and
   the control unit controls the speed of rotation of the driving motor based on the detection signals from the sensor mechanism such that the extrusion rate and the suction rate of the piston are being independently controlled from each other.

3. The pulsatile flow generating pump for a catheter simulator according to claim 1, wherein
   a one-way valve for allowing inflow of liquid from the outside of the pump and regulating outflow of liquid to the outside of the pump is provided at the suction port, and
   a one-way valve for allowing outflow of liquid to the outside of the pump and regulating inflow of liquid from the outside of the pump is provided at the extrusion port.

4. The pulsatile flow generating pump for a catheter simulator according to claim 3, wherein the one-way valve provided at the extrusion port and including a umbrella valve having a main body located on a side of the container for installing the heart model and an umbrella-shaped body located at a side of the cylinder.

5. The pulsatile flow generating pump for a catheter simulator according to claim 4, wherein the one-way valve provided at the extrusion port and to simulate a portion of blood that is sent from a side of the heart main body to a side of the aorta returning from the side of the aorta toward the side of the heart main body, the umbrella-shaped body having an additional opening for allowing a partial inflow of a portion of the liquid from the outside of the pump at the time of a suction movement of the piston.

6. The pulsatile flow generating pump for a catheter simulator according to claim 1, further comprising an adjusting dial located on a lateral surface of a case which houses the pulsatile flow generating pump for selecting a value of the output pulsatile flows.

* * * * *